(No Model.) 2 Sheets—Sheet 1.
W. H. SARGENT.
DRUGGIST'S WEIGHING SCALE.
No. 489,331. Patented Jan. 3, 1893.
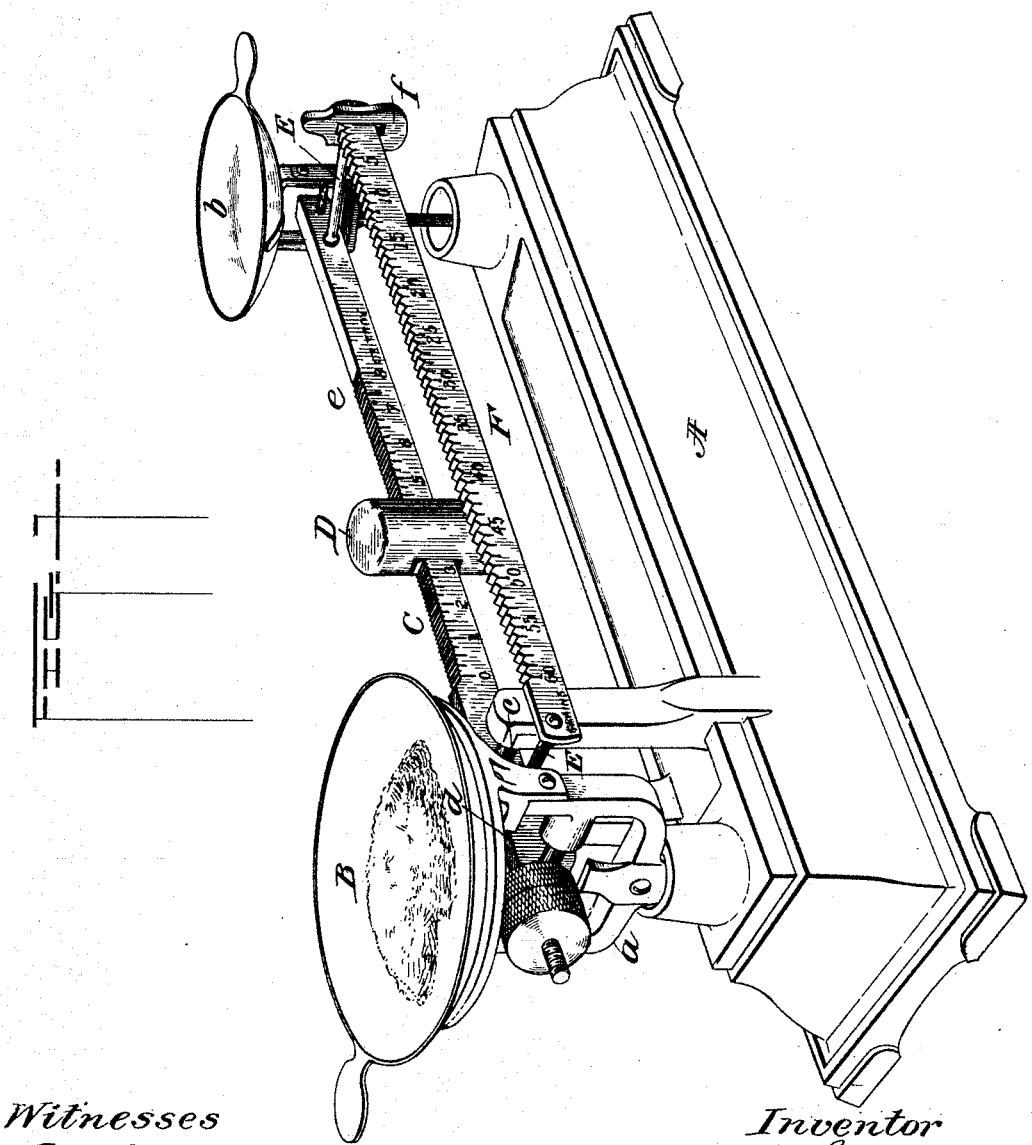
Witnesses
T. A. Conner Jr
Gales P. Moore
Inventor
Willis H. Sargent,
by Chas. L. Sturtevant
his Attorney.

(No Model.) 2 Sheets—Sheet 2.
W. H. SARGENT.
DRUGGIST'S WEIGHING SCALE.
No. 489,331. Patented Jan. 3, 1893.
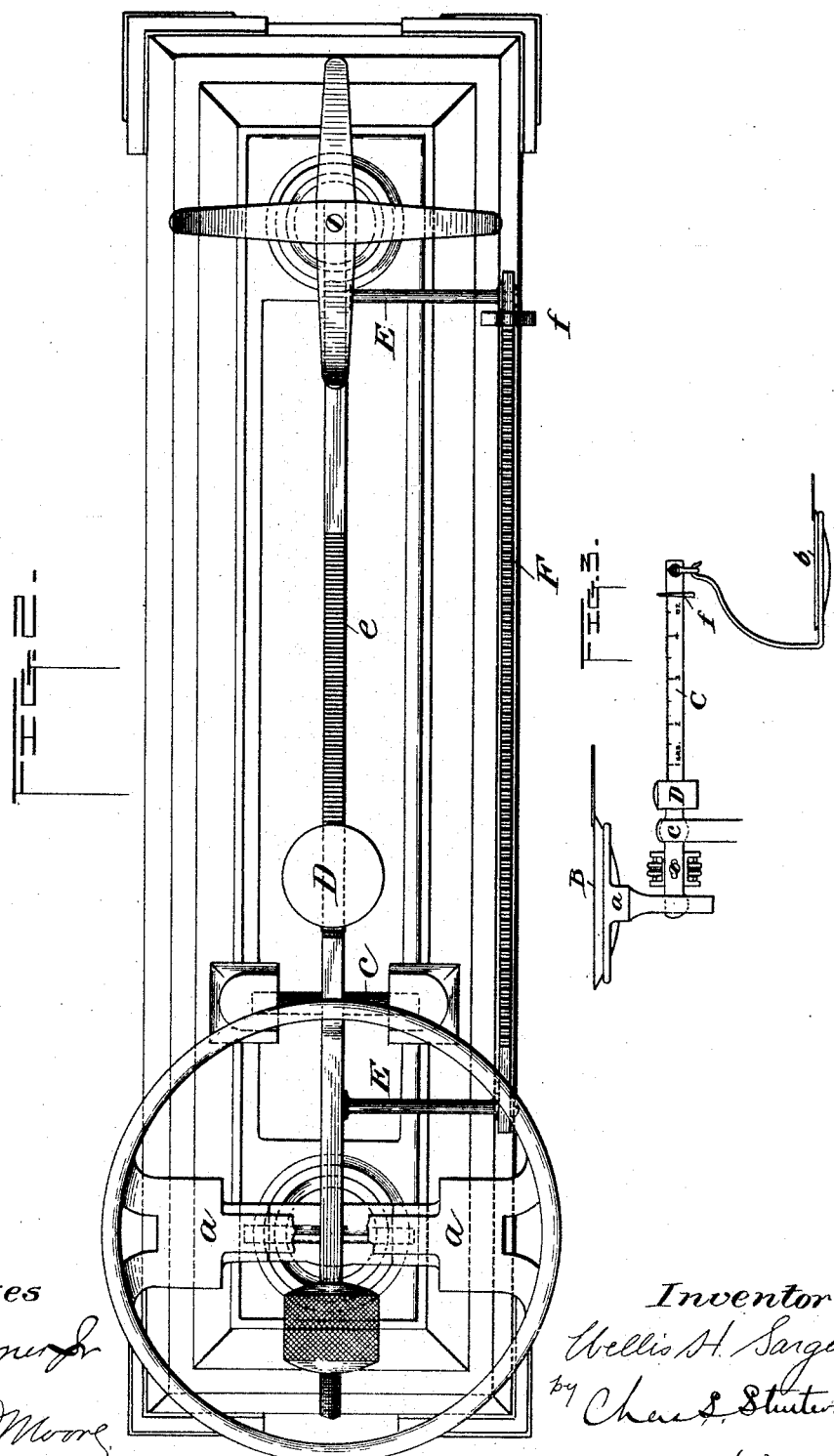
Witnesses
T. A. Connor Jr.
Gales P. Moore
Inventor
Willis H. Sargent
by Chas. A. Sturtevant
his Attorney

UNITED STATES PATENT OFFICE.

WILLIS H. SARGENT, OF ST. JOHNSBURY, VERMONT, ASSIGNOR TO THE E. & T. FAIRBANKS & COMPANY, OF SAME PLACE.

DRUGGIST'S WEIGHING-SCALES.

SPECIFICATION forming part of Letters Patent No. 489,331, dated January 3, 1893.

Application filed September 3, 1892. Serial No. 444,934. (No model.)

*To all whom it may concern:*

Be it known that I, WILLIS H. SARGENT, a citizen of the United States, residing at St. Johnsbury, in the county of Caledonia and State of Vermont, have invented certain new and useful Improvements in Scales, of which the following is a description, reference being had to the accompanying drawings, and to the letters of reference marked thereon.

My invention relates to an improvement in scales.

The object is to provide a scale of the general form and appearance of the well known even balance scales used principally by druggists, but adapted to be used for both coarse and very fine weighing; i. e., the two ends of the scale are of different degrees of delicacy in working, one being used for articles of an ounce or over in weight while finer articles, as for example, those weighing between one and sixty grains, are weighed in the opposite end of the scale, this end working in a very delicate manner.

My invention consists in the various matters hereinafter described and referred to in the appended claims.

The invention is illustrated in the accompanying drawings, in which

Figure 1 is a perspective view of a scale embodying my invention; and Fig. 2 is a top plan view of the same, the scale pans being removed. Fig. 3 is a modification of my invention.

In the drawings, A represents the base or standard on which the parts are supported.

B is the scale pan designed to contain the heavier articles to be weighed, and $b$ is a smaller pan for weighing finer articles. The pans are supported on the upper ends of posts or standards $a$ of the ordinary construction and beneath the standard A are the usual arms or levers (not shown) pivoted at one extremity to the lower ends of the posts $a$ and at their opposite end to a common pivot rod situated directly beneath the fulcrum of the scale beam. The construction of the pans, posts and arms or levers referred to does not form part of the present invention and is not herein described specifically.

C represents the main beam, the fulcrum point of which is located at $c$, said fulcrum point being nearer one end than the other. On the short arm $d$ of this beam is supported the post or standard which carries the large pan B for weighing the heavier articles. The long arm $e$ of this main beam is graduated as shown up to eight ounces troy and is provided with a suitable poise D. Upon the end of the long arm $e$ of the main beam is mounted the post carrying the scale pan $b$. Attached to the main beam by studs or posts E is a side beam F arranged parallel to the main beam and, as herein shown, graduated from 0 to 60 grains beginning at the right hand end. Sliding upon this beam F is a poise $f$ which is used when fine articles are to be weighed in the small pan. It will be understood that when both pans are in position, the poise on the main beam at 0, i. e., at its nearest point to the fulcrum, and the poise on the side beam at the outer extremity thereof, or farthest away from the fulcrum, the scale balances. In order to weigh out a given number of ounces, the poise on the main beam is moved to the proper number and as much of the article placed in the pan as causes the scale to balance. To weigh articles of less than one ounce the poise on the side beam is moved to the proper number and an amount of material sufficient to force down the small pan and balance the scale is placed therein. This scale supplies a long felt want and is extremely useful in practice in that upon the same scale it is possible to accurately weigh by very fine subdivisions, as from one grain up to quite large capacity, viz., eight ounces troy, this being accomplished by placing the heavier or larger pan on the short arm of the beam and having its poise on the long arm, while the lighter or smaller pan is placed upon the long arm of the beam and its poise also travels thereon.

While I have herein shown, therefore, a main and side beam differently graduated it will be understood that in reality they constitute one beam only having the two parts and therefore I am not restricted to the number or style of the graduations on the beam nor to the particular location of the two beams with respect to each other. The form described above is preferred but as a matter of fact the side beam may be dispensed with and the two poises slide on the main beam, one set of graduations only being used, the poises in connection with the receptacles operating to weigh in the manner above referred to, the same graduating notches being used for both poises as shown in Fig. 3, and such a construction I consider to be within the scope of my invention.

I claim as my invention

1. In a scale, a beam having its fulcrum nearer one end than the other, a receptacle for heavy articles carried by the shorter arm, a receptacle for lighter articles on the long arm, said beam having two sets of graduations, and a separate poise for each set of graduations; substantially as described.

2. In a scale, a beam comprising a main part carrying upon either end a receptacle for the articles to be weighed and having its fulcrum nearer one end than the other, a poise sliding thereon, a second part attached to said main part, and a poise sliding thereon, the parts of said beam being provided with different sets of graduations; substantially as described.

3. In a scale, a beam, receptacles carried on opposite sides of the fulcrum thereof, and a separate poise for each receptacle sliding on said beam; substantially as described.

4. In a scale, a beam having its fulcrum nearer one end than the other, a receptacle for heavy articles carried by the shorter arm, a receptacle for lighter articles on the long arm, and a poise for each receptacle sliding on the long arm; substantially as described.

5. In a scale, a beam having its fulcrum nearer one end than the other, a receptacle carried upon each arm of the beam, said beam having two sets of graduations, the zero in one of said sets being located near the fulcrum while the zero in the other set is located near the end of the beam, and a poise for each of said sets of graduations, substantially as described.

6. In a scale, a beam having its fulcrum nearer one end than the other, a receptacle carried upon each arm of the beam, said beam being provided with a plurality of sets of graduations, the sets being located between the fulcrum and one end of the beam, and a poise for each set, substantially as described.

7. In a scale a beam having its fulcrum nearer one end than the other, a receptacle carried upon each arm of the beam, said beam being provided with a plurality of sets of graduations, the sets being located between the fulcrum and one end of the beam, the zero upon one set being at the end of the graduations nearer the fulcrum, while the zero upon a second set is at the end of the graduations nearer the end of the beam, and a poise for each set, substantially as described.

In testimony whereof I affix my signature in presence of two witnesses.

WILLIS H. SARGENT.

Witnesses:
P. F. HAZEN,
C. H. HORTON.